United States Patent [19]
Fujino

[11] Patent Number: 5,337,223
[45] Date of Patent: Aug. 9, 1994

[54] AIMING MECHANISM FOR VEHICLE LAMPS

[75] Inventor: Yuji Fujino, Shimizu, Japan

[73] Assignee: Koito Manufacturing Co., Ltd., Tokyo, Japan

[21] Appl. No.: 31,462

[22] Filed: Mar. 15, 1993

[30] Foreign Application Priority Data

Mar. 18, 1992 [JP] Japan .................. 4-091495

[51] Int. Cl.$^5$ ............................................. B60Q 1/06
[52] U.S. Cl. .............................. 362/66; 362/273;
362/274; 362/288; 362/289; 362/419
[58] Field of Search ............... 362/61, 66, 80, 420,
362/427, 269, 273, 274, 275, 285, 287, 288, 289,
371, 418, 419, 428

[56] References Cited

U.S. PATENT DOCUMENTS

| | | | |
|---|---|---|---|
| 4,412,275 | 10/1983 | McMahan | 362/80 |
| 4,419,721 | 12/1983 | Gregoire et al. | 362/368 |
| 4,471,413 | 9/1984 | Dick | 362/80 |
| 4,621,307 | 11/1986 | Weber | 362/66 |
| 4,674,018 | 6/1987 | Ryder et al. | 362/424 |
| 4,689,725 | 8/1987 | Saijo et al. | 362/66 |
| 4,703,399 | 10/1987 | Van Duyn et al. | 362/66 |
| 4,742,435 | 5/1988 | Van Duyn et al. | 362/66 |
| 4,761,717 | 8/1988 | McMahan et al. | 362/66 |
| 4,794,495 | 12/1988 | McMahan et al. | 362/66 |
| 4,839,785 | 6/1989 | Ohishi | 362/418 |
| 4,843,523 | 6/1989 | Nakamura | 362/69 |
| 4,866,577 | 9/1989 | Jocher et al. | 362/80 |
| 4,881,152 | 11/1989 | Watanabe et al. | 362/61 |
| 4,922,387 | 5/1990 | Ryder et al. | 362/61 |

*Primary Examiner*—James C. Yeung
*Assistant Examiner*—Alan Cariaso
*Attorney, Agent, or Firm*—Sughrue, Mion, Zinn, Macpeak & Seas

[57] ABSTRACT

An aimable vehicle headlamp is disclosed which has a lamp unit rigidly held by a mounting ring which is of rectangular, horizontally elongated shape as seen in a front view and which is to be mounted to a vehicle for rotary motion in every direction within limits. A helical tension spring is coupled to the mounting ring at a point adjacent one corner thereof for biasing the same toward the vehicle. A horizontal aiming screw extends between a first lug on one shorter side, away from the corner, of the mounting ring and the vehicle. A vertical aiming screw extends between a second lug on one longer side, also away from the corner, of the mounting ring and the vehicle. The second lug projects from the one longer side of the mounting ring a greater extent than does the first lug from the one shorter side of the mounting ring, so that approximately equal forces are required for turning the horizontal and vertical aiming screws.

4 Claims, 4 Drawing Sheets

AIMING MECHANISM FOR VEHICLE LAMPS

BACKGROUND OF THE INVENTION

This invention relates generally to electric lamps, and particularly to those for use on motor vehicles such as, typically, headlamps. Still more particularly, the invention pertains to improvements in aiming mechanisms for aiming and retaining headlamps or the like in the proper position with respect to the vehicle.

Vehicle headlamps are being manufactured with great diversity in shape and size to suit the particular motor vehicle for which they are intended, from both esthetic and utilitarian points of view. Among the most popular of headlamp shapes is a horizontally elongated rectangle. A headlamp of this design comprises a lamp unit of horizontally elongated rectangular shape, as seen in a front view, a mounting ring of matching shape upon which the lamp unit is mounted, and a retaining ring holding the lamp unit against the mounting ring.

It has also been widely practiced to equip such a headlamp with an aiming mechanism for aiming and retaining the headlamp in the proper angular position, both vertically and horizontally, relative to the vehicle. A typical aiming mechanism comprises a helical tension spring and two aiming screws. The tension spring is engaged with the mounting ring at or adjacent one of its bottom corners for biasing the mounting ring toward the vehicle. The first of the two aiming screws extends between one shorter side, away from said one corner, of the mounting ring and the vehicle. The second aiming screw extend between the top side of the mounting ring and the vehicle.

Thus, with the tightening or loosening of the first aiming screw, the mounting ring is tilted with the lamp unit about a line that extends through the tension spring and the second aiming screw in a plane at right angles with the lamp axis, so that the lamp unit is aimed substantially horizontally. The manipulation of the second aiming screw results in the tilting of the lamp unit approximately vertically about another line extending through the tension spring and the first aiming screw in the same plane as above.

A problem has been encountered with the aiming mechanisms of the foregoing construction as applied to a vehicle headlamp of horizontally elongated, rectangular shape. Both horizontal and vertical aiming screws are tightened against the force of the tension spring. Consequently, the force required for tightening the horizontal aiming screw is inversely proportional to the perpendicular distance from that screw to the noted line extending through the tension spring and the vertical aiming screw. The force required for tightening the vertical aiming screw is similarly inversely proportional to the perpendicular distance from that screw to the noted line extending through the tension spring and the horizontal aiming screw.

However, because of the horizontally elongated shape of the lamp unit, and therefore of the mounting ring, the two distances in question have so far been not alike, and neither have been the forces required for tightening the two screws. The vertical aiming screw has been harder to tighten than the horizontal. The greater force exerted on the vertical aiming screw has often resulted in the destruction of its head.

SUMMARY OF THE INVENTION

The present invention seeks to make the two aiming screws equally easy to manipulate in aimable vehicle lamp assemblies of the kind defined.

Briefly, the invention may be summarized as an aimable vehicle lamp assembly comprising an electric lamp unit, and a mounting ring rigidly holding the lamp unit and adapted to be mounted to a vehicle so as to be capable of rotary motion relative to the vehicle in every direction within limits. The mounting ring is approximately rectangular in shape, when the lamp assembly is seen in a front view, including a pair of shorter sides and a pair of longer sides. Also included in an aiming mechanism comprising spring means coupled to the mounting ring at a point adjacent one corner of the mounting ring for biasing the same toward the vehicle, a first aiming screw for coupling one shorter side, away from the one corner, of the mounting ring to the vehicle in order to aim the lamp unit relative to the vehicle in a first direction, and a second aiming screw for coupling one longer side, away from the one corner, of the mounting ring to the vehicle in order to aim the lamp unit relative to the vehicle in a second direction which is substantially at right angles with the first direction.

According to the invention, the spring means and the first and the second aiming screws are so arranged relative to one another that, as seen in a plane at right angles with the axis of the lamp unit, a distance between the first aiming screw and a line between the spring means and the second aiming screw is approximately equal to a distance between the second aiming screw and a line between the spring means and the first aiming screw.

The above relative arrangement of the spring means and the first and the second aiming screws necessitates the exertion of approximately the same manual force for turning the second aiming screw as for turning the first aiming screw. Stated in other words, a less force is required for turning the second aiming screw, which normally is a vertical aiming screw, than heretofore. The aiming of the headlamp is therefore made easier, and the risk of ruining the head of the second aiming screw is also materially reduced.

The above and other features and advantages of this invention and the manner of realizing them will become more apparent, and the invention itself will best be understood, from a study of the following description and appended claims, with reference had to the attached drawings showing a preferred embodiment of the invention.

DESCRIPTION OF THE PREFERRED EMBODIMENT

General

Figure 1:
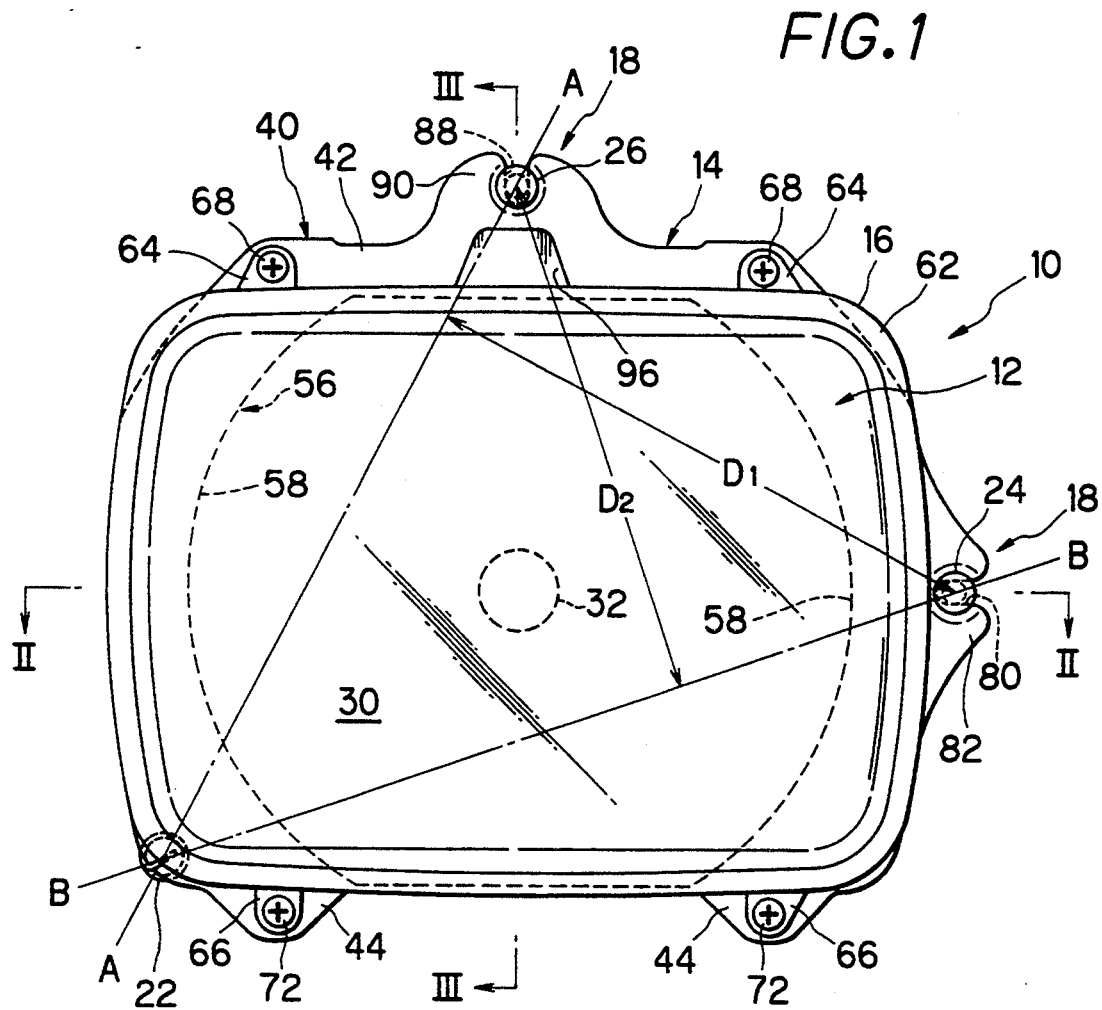
FIG. 1 is a front elevation of an aimable motor vehicle headlamp embodying the principles of this invention.
Figure 2:
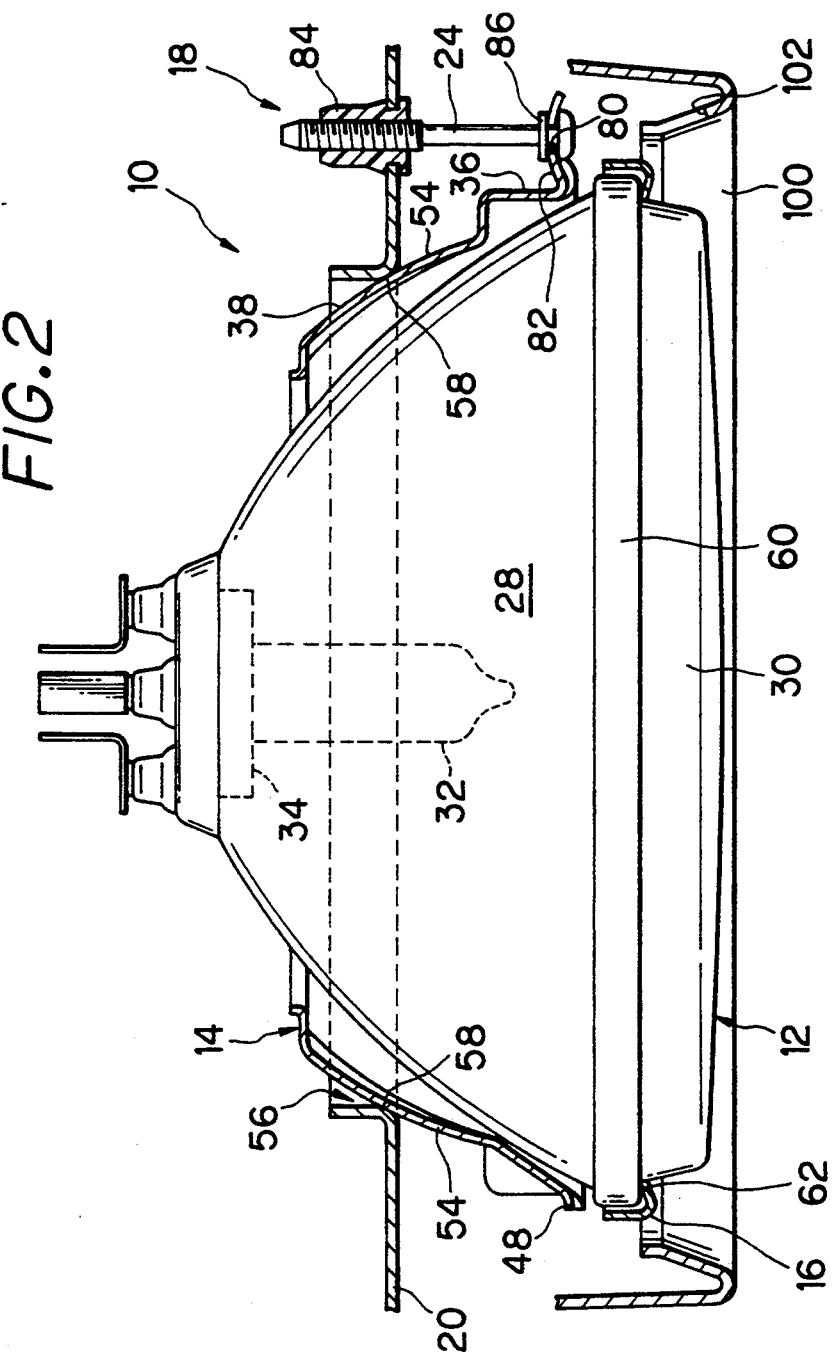
FIG. 2 is a horizontal section through the headlamp, taken along the line II—II in FIG. 1.
Figure 3:
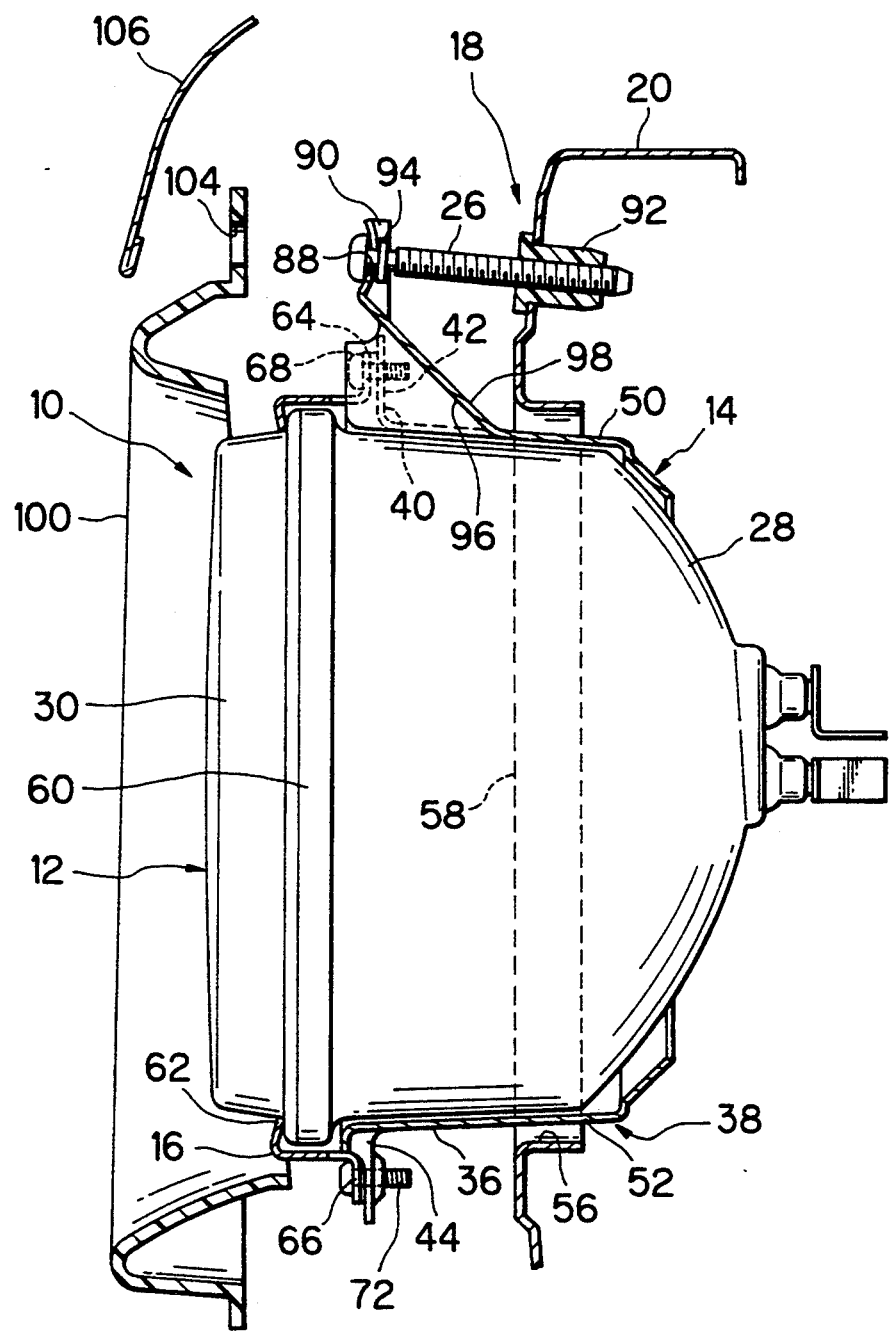
FIG. 3 is a vertical section through the headlamp, taken along the line III—III in FIG. 1.
Figure 4:
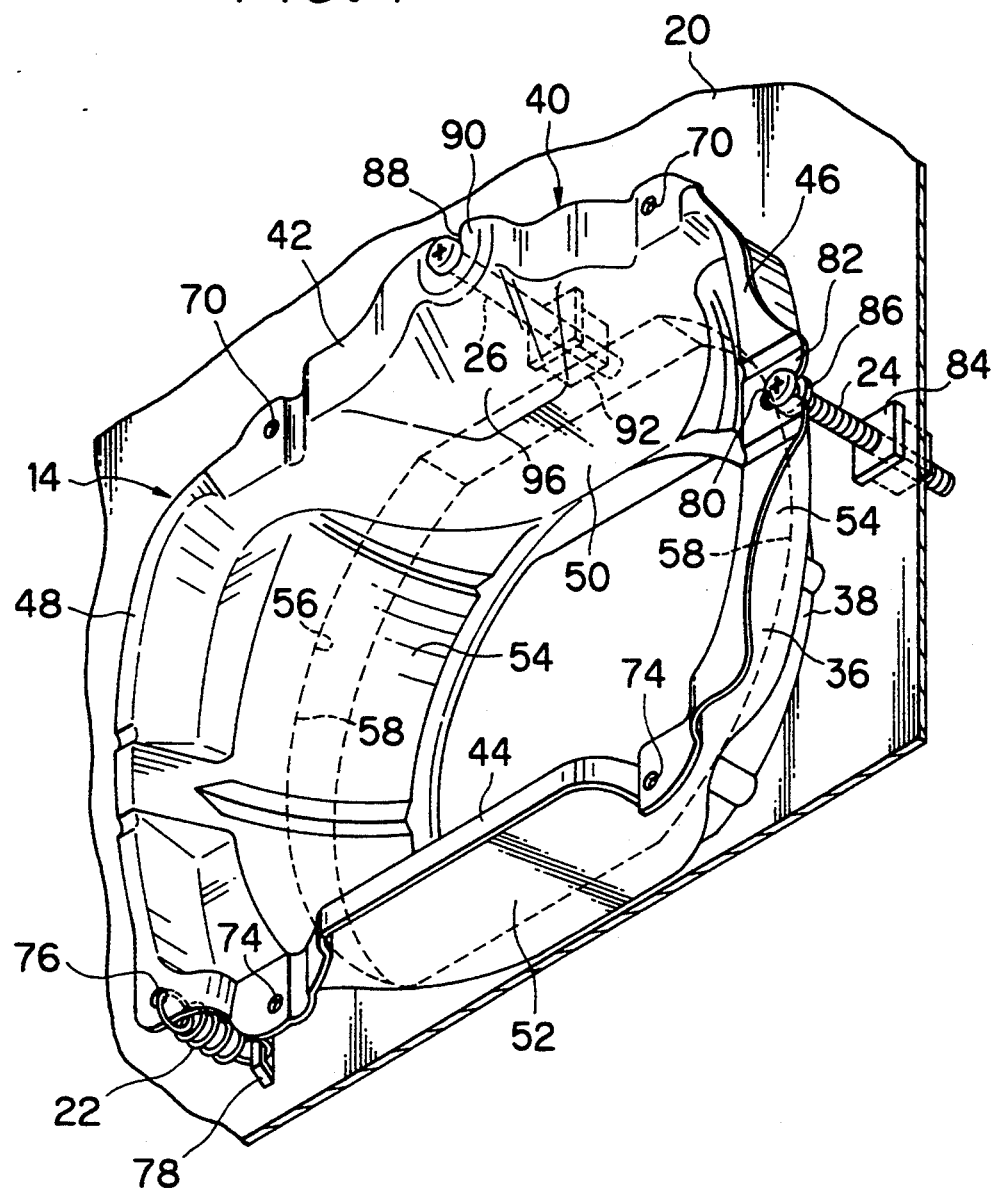
FIG. 4 is a perspective view of the mounting ring and aiming mechanism of the FIG. 1 headlamp, the mounting ring being shown mounted to a vehicle part.

The illustrated vehicle headlamp assembly is generally designated 10 in FIGS. 1-3 and therein shown to comprise an electric lamp unit 12, a mounting ring 14, a retaining ring 16, and an aiming mechanism 18. The lamp unit 12 is cradled in the mounting ring 12 and firmly prevented from any accidental detachment therefrom by the retaining ring 16. As shown in FIGS. 2-4, the mounting ring 12 is mounted to a vehicle part 20 in a ball and socket fashion, so that the mounting ring together with the lamp unit 12 thereon is capable of rotary motion in every direction within limits relative to the vehicle.

The aiming mechanism 18 comprises a helical tension spring 22, FIGS. 1 and 4, a horizontal aiming screw 24, FIGS. 1, 2 and 4, and a vertical aiming screw 26, FIGS. 1, 3 and 4. The tension spring 22 and the two aiming screws 24 and 26 all act between mounting ring 12 and vehicle part 20 for adjusting the aim of the lamp unit 12 both horizontally and vertically.

The following is a more detailed discussion of the lamp unit 12, mounting ring 14, retaining ring 16, and aiming mechanism 18, in that order and under separate headings. The operational description of the headlamp assembly 10, particularly of the aiming mechanism 18, will follow the discussion of the listed components.

Lamp Unit

As shown in FIGS. 1-3, the lamp unit 12 comprises a generally cup-shaped reflector 28, a lens 30 closing the open front, shown directed toward the viewer in FIG. 1, downward in FIG. 2 and leftward in FIG. 3, of the reflector, and an electric lighting bulb 32 disposed in the space bounded by the reflector and the lens. The bulb 30 has its base 34, FIG. 2, mounted centrally to the closed back of the reflector 26 and extends forwardly therefrom.

As seen in a front view as in FIG. 1, the lamp unit 12 is generally rectangular in shape, having a greater side-to-side horizontal dimension than a top-to-bottom vertical dimension.

Mounting Ring

While the mounting ring 14 appears in all of FIGS. 1-4, it is best revealed in FIG. 4, which does not show the lamp unit 12 but only the mounting ring as mounted to the vehicle part 20. The mounting ring 14 is a one-piece punching of sheet metal generally shaped to fit over the lamp unit 12.

Broadly, the mounting ring 14 comprises a front part 36 and a rear part 38. The mounting ring front part 36 is shaped like a horizontally elongated rectangle, as seen in a front view, in conformity with the rectangular shape of the lamp unit 12. An annular flange 40 extends outwardly from the front end of the mounting ring front part 36. Since the mounting ring front part 36 is substantially rectangular in shape as aforesaid, the mounting ring flange 40 comprises a top section 42, a bottom section 44, a right side section 46 and a left side section 48. The mounting ring flange top and bottom sections 42 and 44 are longer than the mounting ring flange side sections 46 and 48.

The mounting ring rear part 38 is substantially tubular in shape, comprising a top section 50, a bottom section 52, and a pair of side sections 54. As will be noted from FIGS. 3 and 4, the mounting ring rear part top and bottom sections 50 and 52 are joined to the top and bottom sections of the mounting ring front part 36 in coplanar relationship thereto. FIGS. 2 and 4 indicate, on the other hand, that the pair of mounting ring rear part side sections 54 are shaped like part of a single sphere centered about the mechanical axis of the lamp unit 12 passing through the geometric centers of the reflector 28 and lens 30.

FIGS. 1-3 all show that the mounting ring rear part 38 is received in a headlamp socket 56 formed in the vehicle part 20. The headlamp socket 56 is defined in part by a pair of side walls 58, FIGS. 2 and 4 which are both arched about the geometric center of the socket. The pair of mounting ring rear part side sections 54 make sliding engagement with the pair of arcuate side walls 58 defining the headlamp socket 56. Consequently, the mounting ring 14 together with the headlamp unit 12 mounted thereto is rotatable within limits in every direction relative to the vehicle.

Retaining Ring

The retaining ring 16 is shaped and sized after the lamp unit 12, as seen in a front view as in FIG. 1, being fitted over a mounting flange 60 on the lamp unit. The retaining ring 16 is formed to include an annular flange 62, FIGS. 1-3, turned inwardly from its front end for positively engaging the lamp unit mounting flange 60.

FIGS. 1 and 3 reveal a pair of lugs 64 turned upwardly from the rear end of the top side of the retaining ring 16, and another pair of lugs 66 turned downwardly from the rear end of its bottom side. With its flange 62 engaged as above with the lamp unit mounting flange 60, the retaining ring 16 is fastened to the mounting ring 14 by a pair of screws 68 extending through the top pair of retaining ring lugs 64 and engaged in tapped holes 70, FIG. 4, in the mounting ring flange top section 42, and by another pair of screws 72 extending through the bottom pair of retaining ring lugs 66 and engaged in tapped holes 74 in the mounting ring flange bottom section 44.

Aiming Mechanism

As has been set forth, the helical tension spring 22, the horizontal aiming screw 24 and the vertical aiming screw 26 form the three major components of the aiming mechanism 18.

FIG. 4 best indicates that the tension spring 22 has one of its terminal hooks engaged in a hole 76 in the mounting ring flange 40, and the other hook engaged with a retainer 78 on the vehicle part 20. It is to be noted that the hole 76 is positioned at the corner between mounting ring flange bottom section 44 and left side section 48.

FIGS. 1, 2 and 4 all show the horizontal aiming screw 24 extending through a recess 80 in a lug 82 on the mounting ring flange right side section 46 and engaged in a nut 84 on the vehicle part 20. The nut 84 is shown as a plastic molding. A collar 86 is formed on the blank shank portion of the horizontal aiming screw 24 for positively engaging the lug 82 between itself and the screw head.

FIGS. 1, 3 and 4 indicate that the vertical aiming screw 26 extends through a recess 88 in a lug 90 on the mounting ring flange top section 42 and engaged in another nut 92 on the vehicle part 20. This second nut 92 is also shown as a plastic molding. A collar 94 is also formed on the blank shank portion of the vertical aiming screw 26 for positively engaging the lug 90 between itself and the screw head.

According to the novel concepts of this invention, the lug 90 extends upwardly from the mounting ring flange top section 42 to a greater degree (approximately 2.5 times in this particular embodiment) than does the lug 82 laterally from the mounting ring flange right side section 46. In order to reinforce the longer lug 90, a recess 96 is formed therein to provide a wall 98 which, as best revealed in FIG. 3, slopes upwardly as it extends forwardly along the axis of the lamp unit 12. The lug 90 is thus effectively reinforced against forces parallel to the axis of the lamp unit 12.

At 100 in FIGS. 2 and 3 is shown a lamp garnish of generally rectangular shape surrounding the lamp lens 30 so as to conceal the aiming screws 24 and 26 and other parts that would otherwise be left exposed from behind the lamp unit 12. The lamp garnish 100 has formed therein a hole 102, FIG. 2, in register with the horizontal aiming screw 24 and another hole 104, FIG. 3, in register with the vertical aiming screw 26. A screwdriver is to be inserted in and through these holes 102 and 104 for turning the aiming screws 24 and 26.

Operation

With the lamp unit 12 together with the mounting ring 14 and retaining ring 16 installed as above upon the vehicle part 20, the tension spring 22 urges the pair of mounting ring rear part side sections 54 urged against the pair of arcuate side walls 58 of the vehicle part defining the headlamp socket 56, as best seen in FIG. 2. By reaction, then, the horizontal aiming screw 24 and vertical aiming screw 26 are both sprung substantially forwardly of the headlamp assembly 10.

The tightening or loosening of the horizontal aiming screw 24 results, therefore, in the tilting of the lamp unit 12 about an axis A—A, FIG. 1, extending through the joint between vertical aiming screw 26 and lug 90 on the mounting ring flange top section 42 and the joint between tension spring 22 and mounting ring flange 40. Thus the aim of the lamp unit 12 is adjustable approximately horizontally.

The tightening or loosening of the vertical aiming screw 26 results in the tilting of the lamp unit 12 about an axis B—B extending through the joint between horizontal aiming screw 24 and lug 82 on the mounting ring flange right side section 46 and the joint between tension spring 12 and mounting ring flange 40. The aim of the lamp unit 12 is therefore adjustable approximately vertically.

As has been stated, the lug 90 projects upwardly from the mounting ring flange top section 42 to a greater extent than heretofore, for holding the vertical aiming screw 26 in a position correspondingly spaced away therefrom. This position is so selected that, as measured in an aiming plane at right angles with the mechanical axis of the lamp unit 12, the distance $D_1$, FIG. 1, between the horizontal aiming screw 24 and the line A—A between the tension spring 22 and the vertical aiming screw 26 is approximately equal to the distance $D_2$ between the vertical aiming screw 26 and the line B—B between the tension spring 22 and the horizontal aiming screw 24.

It will therefore be appreciated that no more manual effort is required for turning the vertical aiming screw 26 than for turning the horizontal aiming screw 24. In other words, the vertical aiming screw can be turned more easily than its counterparts in conventional aimable head-lamps of comparable design. The need for exertion of a less force for turning the vertical aiming screw also leads to the reduction of the likelihood of destroying its head.

The improved position of the vertical aiming screw 26 according to the invention, displaced upwardly a greater distance away from the mounting ring flange top section 42 than heretofore, yields an additional advantage. When the lamp assembly 10 is installed on a passenger car, the front end of its engine room hood 106 comes in front of the top portion of the lamp garnish 100, as pictured in FIG. 3. The lamp garnish top portion with the screwdriver hole 104 therein can thus be concealed by the hood 106, making the front view of the vehicle more esthetically appealing.

It is also to be noted that the lug 90 operatively engaging the vertical aiming screw 26 is formed in one piece with the mounting ring 14 for ease of fabrication and assemblage. Moreover, despite its increased vertical dimension, the lug 90 is effectively reinforced against forces parallel to the lamp axis by the slanting wall 98 forming part of the mounting ring. It will, however, be readily contemplated to employ a unitary lug or equivalent part for operative engagement with the vertical aiming screw and to affix such part to the mounting ring.

A variety of additional modifications, alterations or adaptations of the illustrated embodiment will suggest themselves to one skilled in the art, in order to conform to design preferences or to meet the requirements of each specific application of the invention, without departure from the proper scope or fair meaning of the subjoined claims.

What is claimed is:

1. An aimable vehicle lamp assembly comprising:
   (a) an electric lamp unit having an optical axis;
   (b) a mounting ring rigidly holding the lamp unit and adapted to be mounted to a vehicle so as to be capable of rotary motion in every direction within limits relative to the vehicle, the mounting ring being approximately rectangular in shape, when the lamp assembly is seen in a front view, including a pair of shorter sides and a pair of longer sides;
   (c) spring means coupled to the mounting ring at a point adjacent one corner of the mounting ring for biasing the same toward the vehicle;
   (d) a first aiming screw for coupling one shorter side, away from the one corner, of the mounting ring to the vehicle in order to aim the lamp unit relative to the vehicle in a first direction;
   (e) a second aiming screw for coupling one longer side, away from the one corner, of the mounting ring to the vehicle in order to aim the lamp unit relative to the vehicle in a second direction which is substantially at right angles with the first direction;
   (f) the spring means and the first and the second aiming screws being so arranged relative to one another that, as seen in a plane at right angles with the axis of the lamp unit, a distance between the first aiming screw and a line between the spring means and the second aiming screw is approximately equal to a distance between the second aiming screw and a line between the spring means and the first aiming screw;
   (g) whereby approximately equal forces are required for turning the first and the second aiming screws.

2. The aimable lamp assembly of claim 1 wherein the one shorter side of the mounting ring has a first lug for operatively engaging the first aiming screw, and wherein the one longer side of the mounting ring has a second lug for operatively engaging the second aiming screw, the second lug extending from the one longer side of the mounting ring in a direction away from the other longer side of the mounting ring to an extent greater than does the first lug from the one shorter side of the mounting ring in a direction away from the other shorter side thereof.

3. The aimable lamp assembly of claim 1 wherein the one longer side of the mounting ring has a lug formed in one piece therewith for operatively engaging the second aiming screw.

4. The aimable lamp assembly of claim 3 wherein the lug is formed to include a wall extending at an angle to the axis of the lamp unit by way of reinforcement against forces parallel to the optical axis of the lamp unit.

* * * * *